US010337649B1

(12) United States Patent
Dehne et al.

(10) Patent No.: US 10,337,649 B1
(45) Date of Patent: Jul. 2, 2019

(54) STRAKE SYSTEM

(71) Applicant: VIV Solutions LLC, Richmond, TX (US)

(72) Inventors: Julie Ann Dehne, Cypress, TX (US); Donald Wayne Allen, Richmond, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 15/447,011

(22) Filed: Mar. 1, 2017

Related U.S. Application Data

(60) Provisional application No. 62/302,795, filed on Mar. 2, 2016.

(51) Int. Cl.
*F15D 1/10* (2006.01)
*F16L 1/12* (2006.01)
*E21B 17/01* (2006.01)

(52) U.S. Cl.
CPC .............. *F16L 1/123* (2013.01); *E21B 17/01* (2013.01); *F15D 1/10* (2013.01)

(58) Field of Classification Search
CPC ............. F16L 1/123; F21B 17/01; F15D 1/10
See application file for complete search history.

(56) References Cited

U.S. PATENT DOCUMENTS 2,401,783 A 6/1946 Wilcoxon
3,163,221 A 12/1964 Shatto, Jr.
3,176,646 A 4/1965 Natwick et al.
3,194,204 A 7/1965 Nichols et al.
3,248,886 A 5/1966 Blenkarn
3,321,924 A 5/1967 Liddell
3,343,515 A 9/1967 Nichols et al.
3,454,051 A 7/1969 Goepfert et al.
3,472,196 A 10/1969 Ewing et al.
3,557,840 A 1/1971 Maybee
3,611,976 A 10/1971 Hale
3,962,982 A 6/1976 Marchay et al.
4,116,015 A 9/1978 Duncan
4,365,574 A 12/1982 Norminton
4,398,487 A 8/1983 Ortloff et al.
4,474,129 A 10/1984 Watkins et al.
(Continued)

FOREIGN PATENT DOCUMENTS

EP 2525123 11/2012
GB 2335248 A * 9/1999 ........... B63B 21/502
(Continued)

OTHER PUBLICATIONS

Final Office Action dated Jul. 15, 2015, U.S. Appl. No. 13/343,408.
(Continued)

*Primary Examiner* — Tara Mayo-Pinnock
(74) *Attorney, Agent, or Firm* — Womble Bond Dickinson (US) LLP

(57) ABSTRACT

A vortex-induced vibration (VIV) suppression apparatus including a base member having an interior surface dimensioned to at least partly encircle a tubular member; a fin protruding outward from an exterior surface of the base member; and at least one aperture formed through the base member, from the interior surface to the exterior surface.

20 Claims, 8 Drawing Sheets

105
101
105
102A
103A
112
113
103B
102B
105
105
100

102A
122
136
146
145
146
132
145
132
105
105
101
142

(56) References Cited

U.S. PATENT DOCUMENTS

| | | | |
|---|---|---|---|
| 4,505,617 | A | 3/1985 | Miller et al. |
| 4,567,841 | A | 2/1986 | Hale |
| 4,657,116 | A | 4/1987 | Gardner et al. |
| 4,705,331 | A | 11/1987 | Britton |
| 4,832,530 | A | 5/1989 | Andersen et al. |
| 5,456,199 | A | 10/1995 | Kernkamp |
| 5,722,340 | A | 3/1998 | Sweetman |
| 5,869,159 | A | 2/1999 | Padilla |
| 6,019,549 | A | 2/2000 | Blair et al. |
| 6,048,136 | A | 4/2000 | Denison et al. |
| 6,067,922 | A | 5/2000 | Denison et al. |
| 6,347,911 | B1 | 2/2002 | Blair et al. |
| 6,401,646 | B1 | 6/2002 | Masters et al. |
| 6,561,734 | B1 | 5/2003 | Allen et al. |
| 6,565,287 | B2 | 5/2003 | McMillan et al. |
| 6,685,394 | B1 | 2/2004 | Allen et al. |
| 6,695,539 | B2 | 2/2004 | McMillan et al. |
| 6,695,540 | B1 | 2/2004 | Taquino |
| 6,702,026 | B2 | 3/2004 | Allen et al. |
| 6,755,595 | B2 | 6/2004 | Oram |
| 6,789,578 | B2 | 9/2004 | Latham et al. |
| 6,896,447 | B1 | 5/2005 | Taquino |
| 6,928,709 | B2 | 8/2005 | McMillan et al. |
| 6,971,413 | B2 | 12/2005 | Taylor et al. |
| 6,994,492 | B2 | 2/2006 | McMillan et al. |
| 7,017,666 | B1 | 3/2006 | Allen et al. |
| 7,458,752 | B2 | 12/2008 | Esselbrugge et al. |
| 7,485,801 | B1 | 2/2009 | Pulter et al. |
| 7,578,038 | B2 | 8/2009 | McMillan et al. |
| 7,600,945 | B2 | 10/2009 | Burgess |
| 7,674,074 | B2 | 3/2010 | Masters et al. |
| 7,766,580 | B2 | 8/2010 | Dartford et al. |
| 7,842,396 | B2 | 11/2010 | White |
| 8,297,883 | B2 | 10/2012 | Masters et al. |
| 8,511,245 | B2 | 8/2013 | Dehne et al. |
| 8,622,657 | B2 | 1/2014 | Masters et al. |
| 8,770,894 | B1 | 7/2014 | Allen et al. |
| 9,511,825 | B1 | 12/2016 | Henning et al. |
| 9,523,456 | B1 | 12/2016 | Allen et al. |
| 2003/0074777 | A1 | 4/2003 | McMillan et al. |
| 2004/0013473 | A1 | 1/2004 | Gibson |
| 2005/0082730 | A1 | 4/2005 | Murray et al. |
| 2005/0141967 | A1 | 6/2005 | Giles et al. |
| 2006/0153642 | A1 | 7/2006 | Esselbrugge et al. |
| 2006/0280559 | A1 | 12/2006 | Allen et al. |
| 2007/0140797 | A1 | 6/2007 | Armstrong |
| 2007/0296229 | A1 | 12/2007 | Chauvin et al. |
| 2008/0025800 | A1 | 1/2008 | Watkins |
| 2008/0050181 | A1 | 2/2008 | Masters et al. |
| 2008/0236469 | A1 | 10/2008 | Masters et al. |
| 2009/0076529 | A1 | 3/2009 | Ganti |
| 2009/0185867 | A1 | 7/2009 | Masters et al. |
| 2009/0185868 | A1 | 7/2009 | Masters et al. |
| 2009/0252559 | A1 | 10/2009 | Masters et al. |
| 2010/0129159 | A1 | 5/2010 | Brown |
| 2010/0156088 | A1 | 6/2010 | Masters et al. |
| 2010/0181064 | A1 | 7/2010 | Knobloch et al. |
| 2011/0200396 | A1 | 8/2011 | Allen et al. |
| 2013/0014685 | A1 | 1/2013 | Tonchia |
| 2013/0039702 | A1 | 2/2013 | West et al. |
| 2013/0064607 | A1 | 3/2013 | Masters et al. |
| 2015/0086276 | A1 | 3/2015 | Harbison et al. |

FOREIGN PATENT DOCUMENTS

| | | |
|---|---|---|
| GB | 2362444 | 11/2001 |
| WO | WO-2005026560 | 3/2005 |
| WO | WO-2008064102 | 5/2008 |
| WO | WO-2009070483 | 6/2009 |
| WO | WO-2011022332 | 2/2011 |

OTHER PUBLICATIONS

Final Office Action dated Sep. 7, 2016, U.S. Appl. No. 13/343,408.

Final Office Action dated Sep. 4, 2014, U.S. Appl. No. 13/343,408.

Non-final Office Action dated Mar. 27, 2014, U.S. Appl. No. 13/725,077.

Non-final Office Action dated Mar. 9, 2016, U.S. Appl. No. 13/343,408.

Non-final Office Action dated Apr. 9, 2014, U.S. Appl. No. 13/343,408.

Allen, D. W. et al., “Henning Devices: A new class of VIV suppression apparatus for offshore tubulars”, Offshore Technology Conference 19881, 2009, 1-9.

Lee, L. et al., “Blade henning devices for VIV suppression of offshore tubulars”, Proceedings of OMAE: 28th International Conference on Ocean, Offshore and Arctic Engineering, Shell Global Solutions (US) Inc., 2009, 1-6.

VIV Solutions LLC, Final Office Action dated Jul. 27, 2016, U.S. Appl. No. 14/293,775.

VIV Solutions LLC, Non-Final Office Action dated Apr. 7, 2016, U.S. Appl. No. 14/293,775.

Final Office Action dated Nov. 17, 2015, U.S. Appl. No. 13/841,720.

Final Office Action dated Dec. 15, 2016, U.S. Appl. No. 13/841,720.

Non-Final Office Action dated May 13, 2015, U.S. Appl. No. 13/841,720.

VIV Solutions, Non-final Office Action dated Aug. 21, 2012 for U.S. Appl. No. 13/274,207., 7 pages.

VIV Solutions LLC, European search report dated Sep. 26, 2012 for EP Appln. No. 12168141.5.

VIV Solutions LLC, Final Office Action dated Dec. 8, 2015, U.S. Appl. No. 13/706,209.

VIV Solutions LLC, Non-Final Office Action dated Apr. 5, 2017, U.S. Appl. No. 13/841,720.

VIV Solutions LLC, Non-Final Office Action dated May 12, 2017, U.S. Appl. No. 15/099,471.

VIV Solutions LLC, Non-Final Office Action dated May 5, 2015, U.S. Appl. No. 13/706,209.

VIV Solutions LLC, Non-Final Office Action dated Jul. 7, 2017, U.S. Appl. No. 13/841,720.

* cited by examiner

STRAKE SYSTEM

CROSS-REFERENCE TO RELATED APPLICATION

The application is a non-provisional application of U.S. Provisional Patent Application No. 62/302,795, filed Mar. 2, 2016 and incorporated herein by reference.

FIELD

A strake system for a cylindrical member having a relatively large diameter. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression.

Buoyancy cans are used for a variety of applications in the ocean. Their primary function is to support something that is heavier than water to keep it from sinking. Popular uses include their use for providing temporary or permanent support for tubulars such as risers and tendons.

Buoyancy cans may be cylindrical, much like a tubular, and therefore similar to a tubular, also experience VIV. However, due to the potentially large diameter of buoyancy cans, conventional helical strakes with an underlying shell cannot easily be fabricated for large diameters. In addition, helical strakes are usually banded to the underlying tubular and their ability to provide a sufficient clamping force is inhibited with the increased friction associated with larger diameters.

While fairings may also be used for suppressing VIV of buoyancy cans, the size required for a buoyancy can fairing is also problematic. In addition, since fairings weathervane with changes in current direction, they must be kept relatively free of marine growth, which may be expensive for large diameter structures.

SUMMARY

The present invention consists of a helical strake system that may be used effectively on large diameter structures, for example, buoyancy cans. In particular, the helical strake system is designed to work effectively, be easy to install and economical for use on larger diameter structures.

A vortex-induced vibration (VIV) suppression device including a base member having an interior surface dimensioned to at least partly encircle a tubular member; a fin protruding outward from an exterior surface of the base member; and at least one aperture formed through the base member, from the interior surface to the exterior surface. In some embodiments, the base member comprises a length, wherein the length covers less than 90 degrees of the tubular member when the base member is positioned on the tubular member. In addition, in some embodiments, the base member may have a width that is greater than a width of the fin coupled to the base member. Still further, the fin may have a height that is at least 3 percent of an outside diameter of the tubular member, and a pitch between 2 and 20 times an outside diameter of the tubular. In some embodiments, the fin and the base member are hollow. Still further, in some cases, a bushing is positioned within the aperture to facilitate attachment of the base member to the underlying tubular using, for example, a bolt. In some embodiments, an intermediate member positioned between the base member and the tubular member is further provided. The intermediate member may include a cross beam coupled to a plurality of cross braces, and the cross braces are coupled to the interior surface of the base member and an exterior surface of the tubular member. In other embodiments, an extension member extending from at least one end of the base member or the fin and a bracket assembly are provided. The bracket assembly is dimensioned to be mounted to the tubular and the extension member is mounted to the bracket assembly to secure the base member to the tubular.

In another embodiment, a vortex-induced vibration (VIV) suppression system is provided comprising a first strake section having a base member and a helical fin protruding outward from an exterior surface of the base member; a second strake section having a base member and a helical fin protruding outward from an exterior surface of the base member; and a connecting member dimensioned to connect at least one of the first strake section or the second strake section to an underlying tubular. The base member may be dimensioned to encircle less than 50 percent of a circumference of the tubular. In some embodiments, each of the first strake section and the second strake section further include a plurality of apertures formed through the base member, and wherein the connecting member comprises a first end dimensioned to be inserted through at least one of the plurality of apertures and a second end attached to the underlying tubular to hold the first strake section and the second strake section to the tubular. The plurality of apertures may be positioned along a side of the helical fin and may further include a bushing positioned therein. In some embodiments, the connecting member is a bolt stud welded to the tubular at the one end. In other cases, the connecting member comprises an extension member extending from an end of the first strake section or the second strake section and a bracket mounted to the underlying tubular, wherein the extension member is attached to the bracket to hold the first strake section or the second strake section to the underlying tubular. In some embodiments, the first strake section and the second strake section are connected to one another at their ends by the connecting member and a gap is formed between the first strake section and the second strake section. In addition, the first strake section and the second strake section may have a length of less than six feet and are axially aligned along the underlying tubular. In other cases, the first strake section and the second strake section are circumferentially arranged around the underlying tubular and are 120 degrees circumferentially apart.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1:
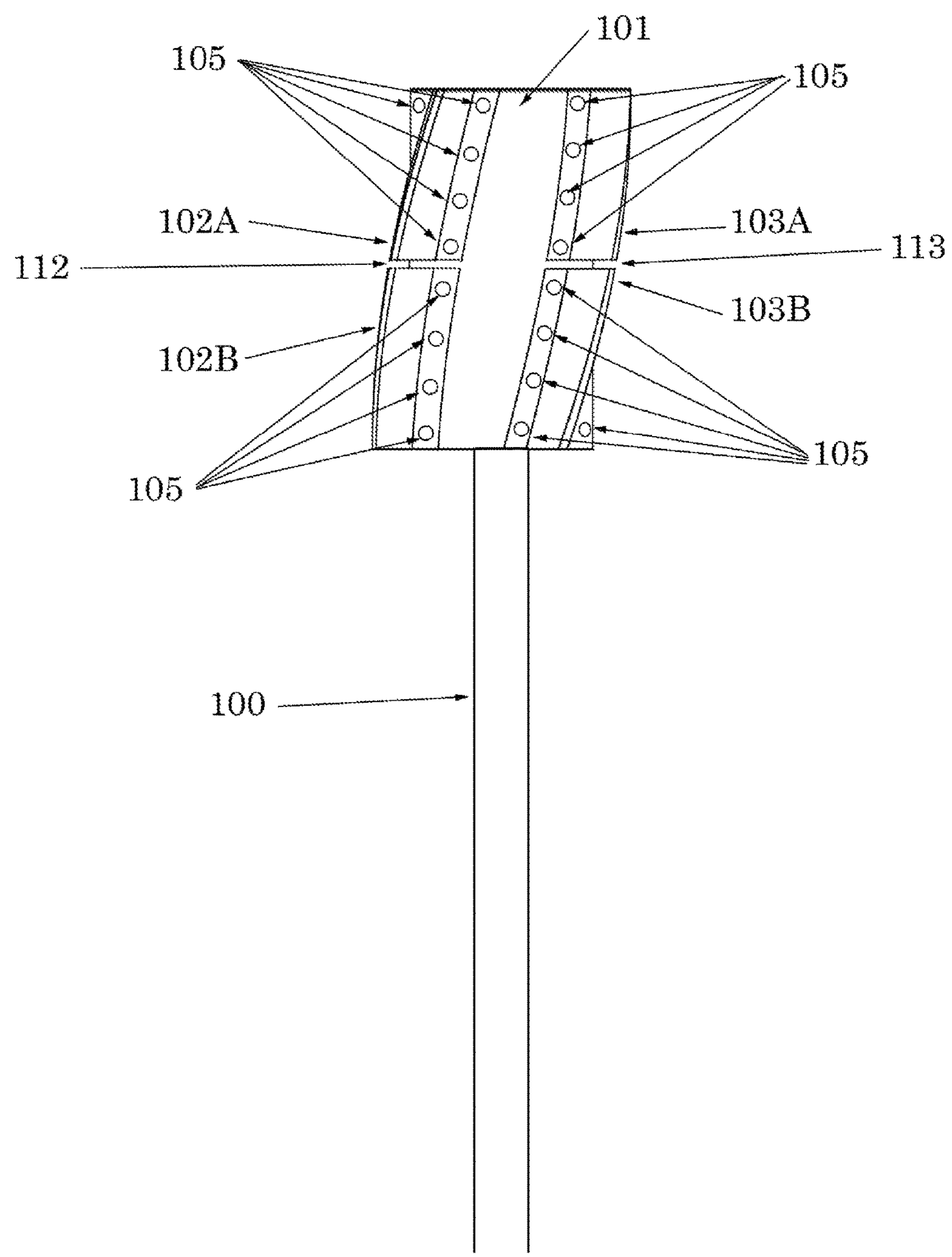
FIG. 1 is a side view of a buoyancy can supporting a tubular with helical strake fins.

Referring now to the invention in more detail, FIG. 1 presents a side view of underlying tubular 100 surrounded by an overlying tubular member 101. Tubular member 101 may, for example, be a buoyancy can that is used to support tubular 100. For example, tubular member 101 may be a buoyancy can that has an outer diameter that is greater than that of the underlying tubular 100 and a length shorter than that of the underlying tubular 100. In other embodiments, however, tubular member 101 could be any type of cylindrical member, for example, a relatively large diameter tubular, drill pipe, collar, or the like. Strake sections 102A and 102B are separated by gap 112 while strake sections 103A and 103B are separated by gap 113. Openings 105 are present in each strake section for attachment of the strake section to tubular 101.

Again referring to FIG. 1, strake sections 102A, 102B, 103A, and 103B extend helically around tubular member 101 (e.g., a buoyancy can) and serve to trip the flow past tubular member 101 in such a way as to minimize VIV. Typically, although not shown here, in addition to strake sections 102A, 102B, 103A, and 103B there may be strake sections on the back side of tubular member 101. If strake sections 102A and 102B are considered one "start" and strake sections 103A and 103B are considered a 2nd start, there will typically be at least one more start so that three starts are present on tubular member 101. Each start is typically 120 degrees circumferentially apart around tubular member 101. Gaps 112 and 113 are optional such that a single strake section can form a complete start and even extend from the top to the bottom of tubular 101. Gaps 112 and 113 may also be quite long or quite short. Openings 105 are used to attach the strake sections to tubular member 101 and may house bushings, inserts, fasteners, rivets or other attachment mechanisms. Any number of openings 105 may be used but there will be at least one opening 105 per strake section and typically four or more per strake section.

Still referring to FIG. 1, strake sections 102A, 102B, 103A, and 103B may be made of any suitable material including, but not limited to: metals, plastics, fiberglass or other composites, wood, or synthetics.

Figure 2:
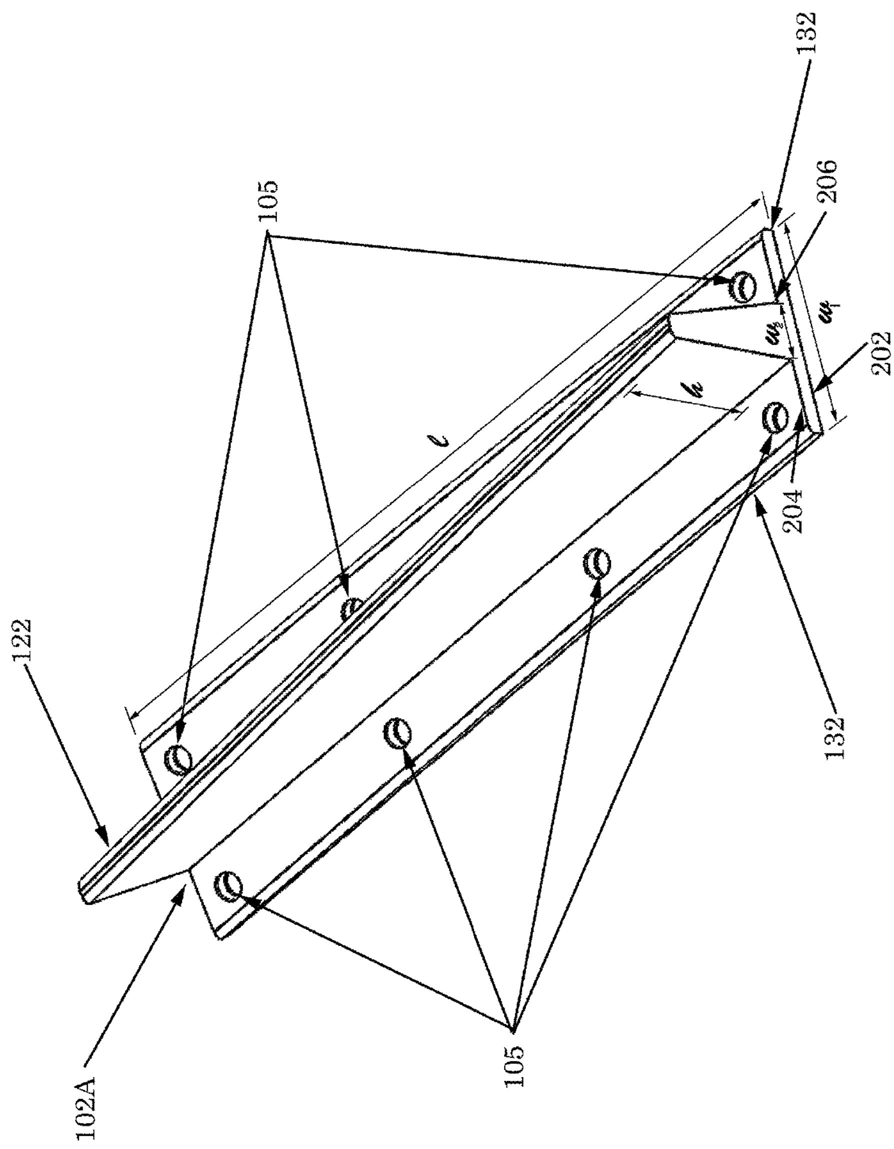
FIG. 2 is a perspective view of a helical strake fin section.

Referring now to FIG. 2, FIG. 2 shows a perspective view of strake section 102A in more detail. Although FIG. 2 refers to strake section 102A, it should be understood that the description and features disclosed herein may further apply to strake sections 102B, 103A and 103B. Strake section 102A may include base 132, fin 122 and openings 105. Base 132 may have an exterior surface 204 from which fin 122 extends and an interior surface 202 which rests on, and partially encircles, the underlying tubular. It should be understood that in some embodiments where strake section 102A is used on an underlying tubular member having a relatively large diameter (e.g., tubular 101), a length (1) of strake section 102A is such that strake section 102A covers 90 degrees or less of underlying tubular member 101, for example, less than 90 degrees, less than 80 degrees, less than 70 degrees or less than 60 degrees. For example, strake section 102A may have a length (1) that is less than that of a typical strake, for example, a length that is less than six feet.

Again referring to FIG. 2, fin 122 may be of any suitable height (h) and width (w2). Typically the height (h) of fin 122, as measured from a bottom portion 206 which connects to the exterior surface 204 or the top of base 132, or from the outside of the underlying buoyancy can, will be at least 3% of the outside diameter of the underlying tubular member (e.g., a buoyancy can or tank) and have a pitch of between 2 and 20 times the outside diameter of the underlying tubular member. It should be understood that the term "pitch" is generally understood to refer to the length or height of one complete helix turn of fin 122 around the tubular, as measured parallel to the axis of the helix. It should further be understood, however, that in some embodiments, where the underlying tubular member is relatively short and/or has a relatively large diameter (e.g., a buoyancy can), fin 122 may also be relatively short, for example, shorter than the pitch, and therefore make less than a complete turn when going from the top to the bottom of the tubular. In some cases, a combination of multiple fin segments may be used to make one complete helix turn. While FIG. 2 shows one shape of fin 122, it may have other shapes such as more rounded or more slender but typically will be sufficiently bluff so that the flow separates near the top of fin 122. Fin 122 may be hollow or may be solid and may have open ends or closed ends.

Still referring to FIG. 2, base 132 will typically have a width (w1) wider than a width (w2) of the fin 122, for example, the bottom of fin 122 is of a sufficient width to house openings 105. For example, the width (w1) of base 132 may be less than 50 percent, less than 25 percent, or less than 10 percent, a circumference of tubular 101 such that base 132 covers a relatively small surface area of tubular 101, for example, less than that of a strake sleeve. While openings 105 may also be located through fin 122, so that fin 122 can be attached directly to the underlying tubular (e.g., a buoyancy can), openings 105 will usually be located on base 132, next to fin 122. Base 132 may be of any sufficient height for suitable structural integrity. Base 132 may have variations in its shape and does not have to be of constant width or height. Openings 105 may be spaced in any number of ways on base 132 and may be of different sizes and shapes or all have the same size and shape.

Still referring to FIG. 2, fin 122 and base 132 may be made of any suitable material including, but not limited to: metals, plastics, fiberglass or other composites, wood, or synthetics. Fin 122 and base 132 may be made of the same material or of different materials and any number of materials may be used to make fin 122 and base 132.

Figure 3A:
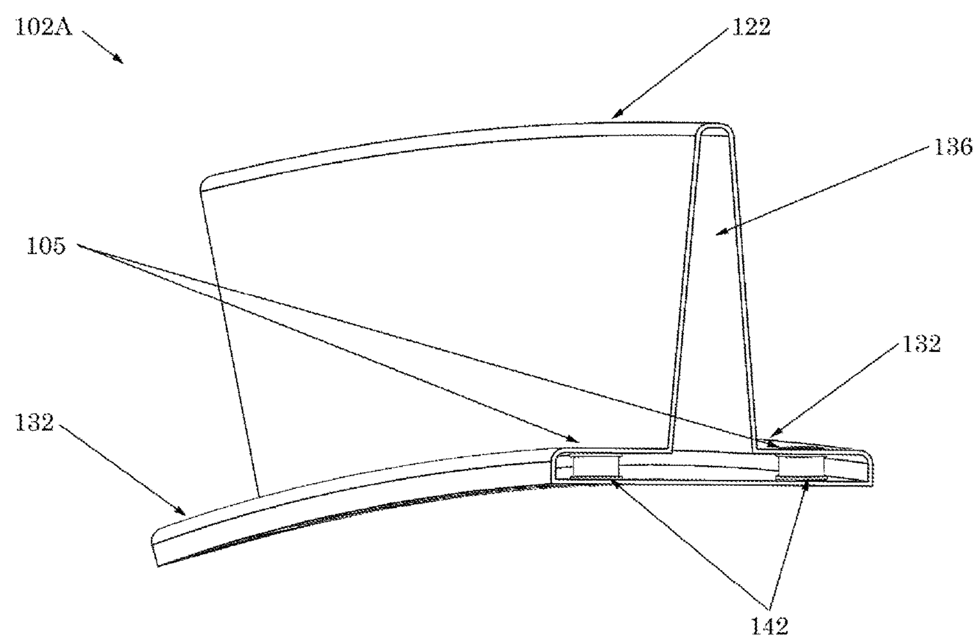
FIG. 3A is a perspective view of a helical strake fin section with bushings.
Figure 3B:
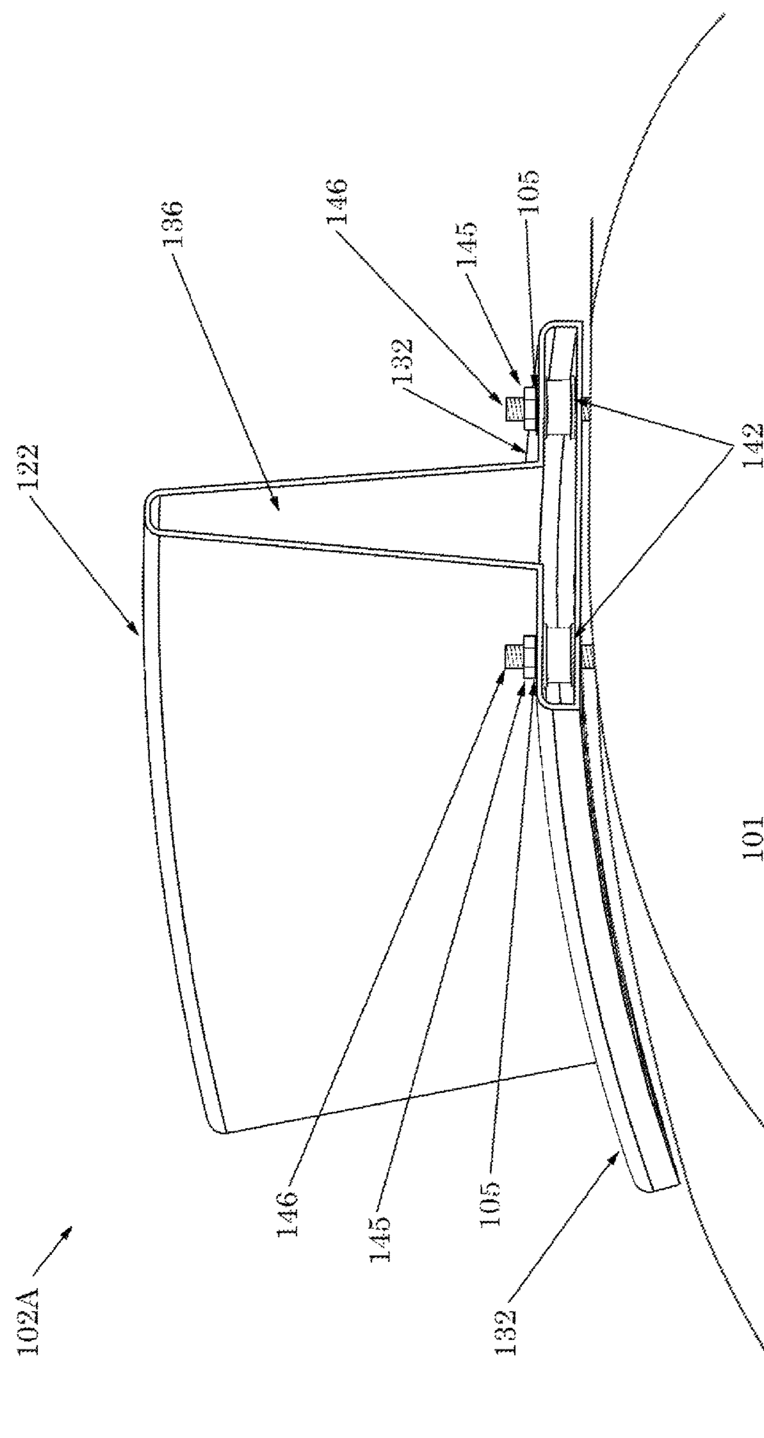
FIG. 3B is a perspective view of the helical strake fin section with bushings of FIG. 3A attached to a tubular.

Referring now to FIG. 3A and FIG. 3B, FIG. 3A and FIG. 3B illustrate perspective views of strake section 102A with fin 122 and base 132 having openings 105. In this embodiment, strake section 102A is hollow as shown by hollow region 136. Bushings 142 are present in openings 105 to facilitate attachment of strake section 102A to the underlying tubular member (e.g., a buoyancy can), which is shown in FIG. 3B. In particular, FIG. 3B shows strake section 102A attached to the underlying tubular member 101 by bolts 146. Bolts 146 may be, for example, threaded studs or all-thread rod segments that are welded (e.g., stud welded) to a surface of tubular member 101. The bolts 146 are then aligned with openings 105 in strake section 102A, and advanced through openings 105 and corresponding bushings 142. Bolts 146 may be secured within openings 105 and bushings 142 using nuts 145 as shown.

In some embodiments, bushings 142 may be molded into base 132 of strake section 102A. Bushings 142 may be of any suitable quantity, size, or shape and may be spaced apart in any desirable manner.

Bushings 142 may further, in some embodiments, be welded to the underlying tubular member and bolts 146 omitted, or may be attached by other means including through an intermediate structure that is, in turn, attached to the underlying tubular member. The attachment of bushings 142 to the underlying tubular member or to any intermediate structure may be made by any suitable means including, but not limited to, welding, chemical bonding, fastening, riveting, pinning, or clamping (these methods may also be used for attaching any intermediate structure to the underlying tubular member, for example, a buoyancy can).

In addition, bushings 142 may be made of any suitable material including, but not limited to: metals, plastics, fiberglass or other composites, wood, or synthetics.

Figure 4:
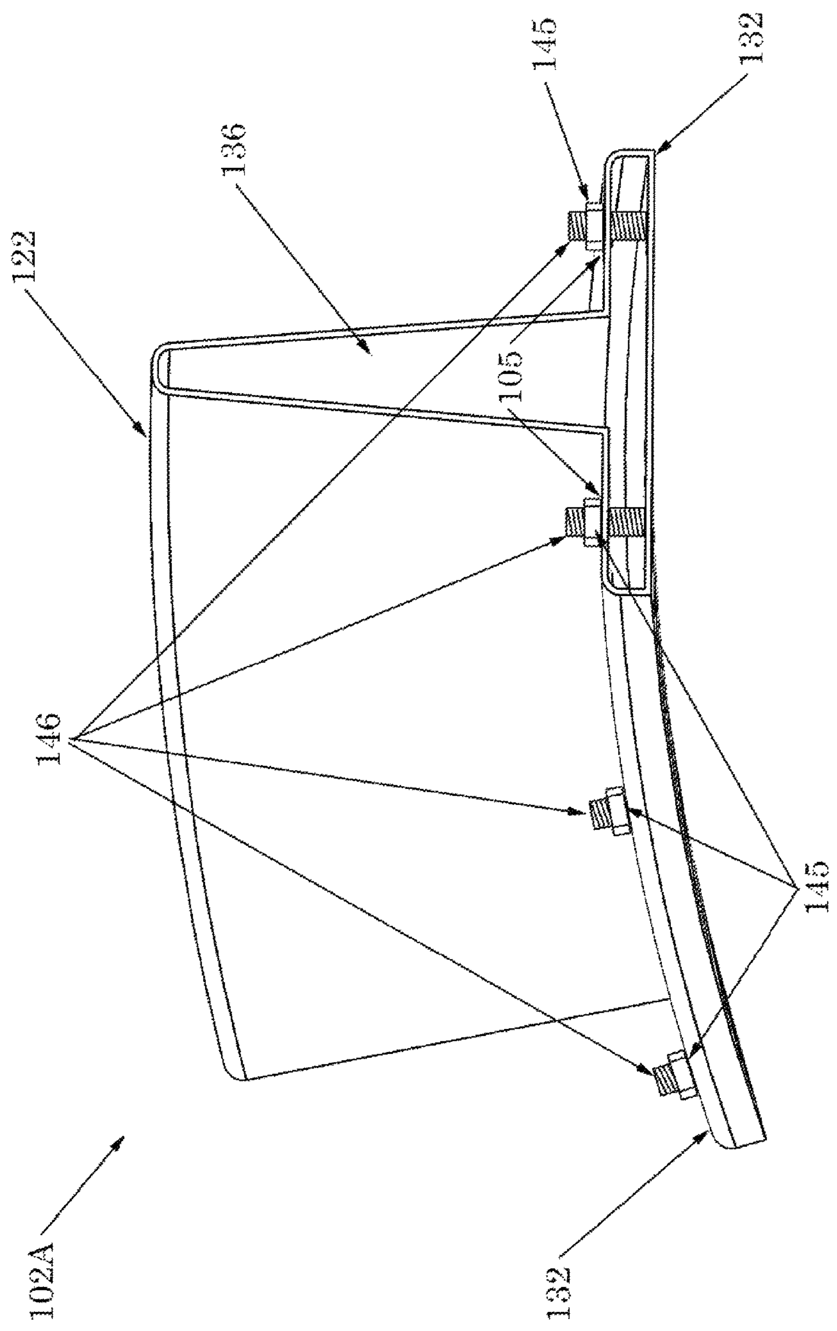
FIG. 4 is a perspective view of a helical strake fin section without bushings.

Referring now to FIG. 4, FIG. 4 illustrates a perspective view of strake section 102A with fin 122 and base 132 having openings 105. Strake section 102A, in this embodiment, is hollow as shown by hollow region 136. Bolts 146 and nuts 145 hold strake section 102A against the underlying tubular member.

Again referring to FIG. 4, bolts 146 may, in some embodiments, be welded (e.g., stud welded) to the underlying tubular member but can also be welded to other intermediate structures. Bolts 146 may be attached to the underlying tubular member by any suitable means in addition to welding including but not limited to, chemical bonding, fastening, riveting, pinning, or clamping (these methods may also be used for attaching any intermediate structure to the underlying buoyancy can). Bolts 146 and nuts 145 may be of any suitable size. Bolts 146 do not have to be threaded and nuts 145 may be welded to bolts 146 or attached by any other suitable means. Any number of bolts 146 and nuts 145 may be used to attach strake section 102A to the underlying tubular member or to any intermediate structure.

Still referring to FIG. 4, bolts 146 and nuts 145 may be made of any suitable material including, but not limited to: metals, plastics, fiberglass or other composites, wood, or synthetics.

Figure 5A:
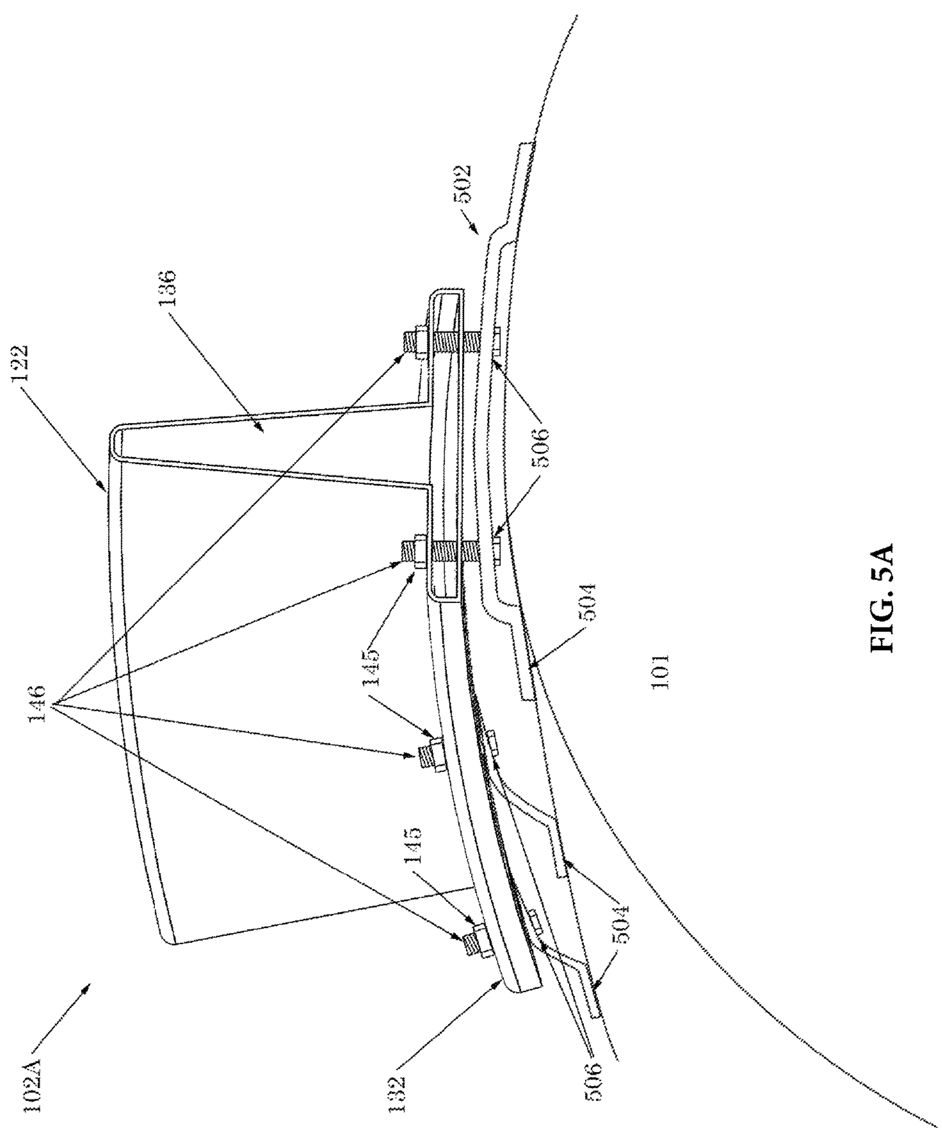
FIG. 5A is a perspective view of a helical strake fin section and intermediate member attached to a tubular.
Figure 5B:
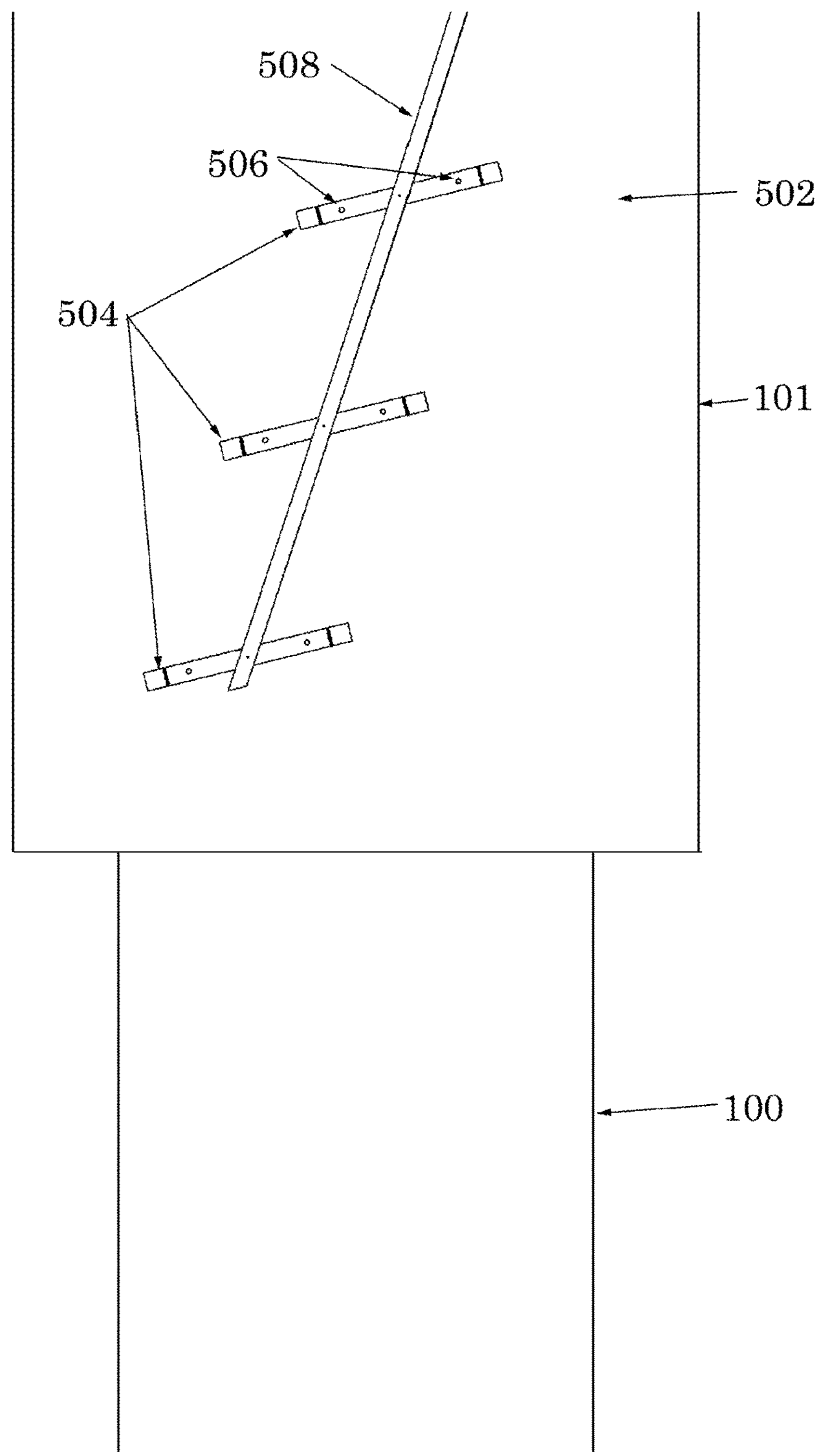
FIG. 5B is a perspective view of the intermediate member of FIG. 5A.

FIG. 5A and FIG. 5B illustrate perspective views of another embodiment of the invention in which strake section 102A is attached to an intermediate member, which is between strake section 102A and underlying tubular 101. Representatively, intermediate member 502 may include a series of cross braces 504 which are mounted to a surface of underlying tubular 101, such as by welding, bolting or the like, and then strake section 102A is mounted to cross braces 504. In this aspect, cross braces 504 include openings 506 which correspond to, and align with, openings 105 of strake section 102A. Bolts 146 can then be inserted through openings 105 of strake section 102A and openings 506 in cross braces 504 to secure strake section 102A to intermediate member 502, and in turn, tubular member 101. Nuts 145 may further be used on either, or both ends, of bolts 146 to secure bolts 146 within the openings 105 and 506.

Intermediate member 502 is shown in more detail in FIG. 5B. In particular, in FIG. 5B, it can be seen that intermediate member 502 includes cross braces 504 which are connected by a cross beam 508. FIG. 5B shows three cross braces 504, although more or less may be used depending upon a length of the strake section that is to be attached to the underlying tubular member 101. In addition, from this view, openings 506 within each of cross braces 504 can be seen more clearly. For example, in the illustrated embodiment, each of cross braces 504 include two openings 506, which correspond to each of the openings 105 formed in the base of strake section 102A. It can further be seen that cross beam 508 is attached to each of cross braces 504 and holds them in a substantially parallel, and laterally offset alignment with respect to one another. In this aspect, when cross beam 508 is arranged on the underlying tubular 101 such that it is at an angle to the axis of tubular 101 (e.g., helically arranged) as shown, the associated strake section (e.g., strake section 102A) can be aligned with openings 506 and attached to underlying tubular 101 in a helical orientation. Still further, it should be understood that in some embodiments, bolts 146 are separate members that are inserted through openings 506 and openings 105 and secured with nuts 145. In other embodiments, bolts 146 may be mounted to a surface of intermediate member 502 (e.g., stud welded) and openings 506 omitted, or mounted (e.g., stud welded) to a surface of underlying tubular 101. In addition, it should be further understood that intermediate member 502 may be made of any suitable material including, but not limited to: metals, plastics, fiberglass or other composites, wood, or synthetics.

Figure 6:
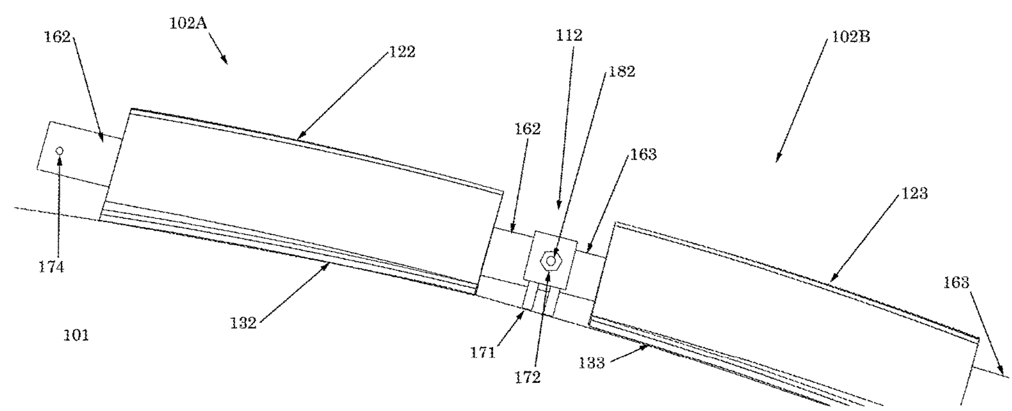
FIG. 6 is side view of two helical strake fin sections that are mechanically attached to a support structure.

Referring now to FIG. 6, this figure shows adjacent strake sections 102A and 102B which contain fins 122 and 123 respectively and bases 132 and 133 respectively. Strake sections 102A and 102B have gap 112 between them and are adjacent to tubular 101. Strake section 102A has an extension or strength member 162 attached to it and strake section 102B has an extension or strength member 163 attached to it. Strength members 162 and 163 are attached to bracket 171 which is attached to tubular 101. Bracket bolt 182 and bracket nut 172 are used to attach strength members 162 and 163 to bracket 171. For example, each end of strength members 162 and 163 have opening 174 is (shown in strength member 162), which is used as a receptacle for any attachment hardware.

Again referring to FIG. 6, by attaching strength members 162 and 163 to strake sections 102A and 102B respectively, less welding may be required than for the options shown in FIGS. 3A-3B and FIG. 4. The strength members 162 and 163 provide a stronger strake and are kept relatively rigid against tubular 101 through bracket 171.

Still referring to FIG. 6, bracket 171 may consist of any suitable structure for connecting strength members 162 or 163 to tubular 101 and thus bolt 182, bracket nut 172, and strength member opening 174 need not be present. Bracket 171 may be attached to tubular 101 by any suitable means in addition to welding including but not limited to, chemical bonding, fastening, riveting, rope, pinning, or clamping (these methods may also be used for attaching bracket 171 or any other structure to any intermediate structure or directly to the underlying buoyancy can). Strength members 162 and 163 may run completely through strake sections 102A and 102B or may be shorter segments that are simply attached to strake sections 102A and/or 102B by any suitable means. Strength members 162 and 163 may be of any suitable size or shape. Strength members 162 and 163 may be attached to each other or directly to a bracket 171 without being attached to each other.

Still referring to FIG. 6, bracket 171, bolt 182, bracket nut 172, strength member 162, and strength member 163 may be made of any suitable material including, but not limited to: metals, plastics, fiberglass or other composites, wood, or synthetics. Bracket 171, bolt 182, bracket nut 172, strength member 162, and strength member 163 may consist of one or more various common structures such as clamps, brackets, trusses, rope, cable, beams, and plates.

The above aspects of this invention may be mixed and matched in any manner suitable to achieve the purposes of this invention. Various appurtenances may be added, in addition to the components described, for assisting with this invention. These appurtenances, or one or more of the components described herein, may be made to be long lasting or made to quickly rust or corrode in seawater. Various methods may be used for attaching the strake sections to the underlying buoyancy can.

In broad embodiment, the present invention consists of one or more helical strake sections that are attached directly or indirectly to an underlying buoyancy can.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A vortex-induced vibration (VIV) suppression apparatus comprising:
- a base member having an interior surface dimensioned to at least partly encircle an underlying tubular member and an exterior surface, wherein a hollow space is formed between the interior surface and the exterior surface;
- a fin protruding outward from an exterior surface of the base member;
- at least one aperture formed entirely through the interior surface and the exterior surface of the base member, such that it extends from the interior surface to the exterior surface; and
- a bushing positioned within the at least one aperture mounted within the hollow space between the interior surface and the exterior surface, and wherein the aperture is dimensioned to receive a fastener mounted to an underlying tubular member.

2. The VIV suppression apparatus of claim 1 wherein the base member comprises a length, wherein the length covers less than 90 degrees of the tubular member when the base member is positioned on the tubular member.

3. The VIV suppression apparatus of claim 1 wherein the base member comprises a width, wherein the width is greater than a width of the fin coupled to the base member.

4. The VIV suppression apparatus of claim 1 wherein the fin comprises a height, wherein the height is at least 3 percent of an outside diameter of the tubular member.

5. The VIV suppression apparatus of claim 1 wherein the fin comprises a pitch, wherein the pitch is between 2 and 20 times an outside diameter of the tubular.

6. The VIV suppression apparatus of claim 1 wherein the fin is hollow.

7. The VIV suppression apparatus of claim 1 wherein the apparatus comprises the underlying tubular member, and the fastener is a bolt extending radially outward from an exterior surface of the underlying tubular member.

8. The VIV suppression apparatus of claim 1 further comprising:
- an intermediate member positioned between the base member and the tubular member.

9. The VIV suppression apparatus of claim 8 wherein the intermediate member comprises a cross beam coupled to a plurality of cross braces, and the cross braces are coupled to the interior surface of the base member and an exterior surface of the tubular member.

10. The VIV suppression apparatus of claim 1 further comprising:
- an extension member extending from at least one end of the base member or the fin; and
- a bracket assembly, wherein the bracket assembly is dimensioned to be mounted to the tubular and the extension member is mounted to the bracket assembly to secure the base member to the tubular.

11. A vortex-induced vibration (VIV) suppression apparatus comprising:
- a first strake section having a base member and a helical fin protruding outward from an exterior surface of the base member;
- a second strake section having a base member and a helical fin protruding outward from an exterior surface of the base member;
- a connecting member mounted to an underlying tubular and dimensioned to directly connect at least one of the first strake section or the second strake section to the underlying tubular, and wherein the base member of the first strake section and the base member of the second strake section are dimensioned to encircle less than 90 percent of a circumference of the underlying tubular; and
- a plurality of apertures formed through the base member of the first strake section and the second stake section, and
- wherein the connecting member is a bolt having a first end dimensioned to be inserted through at least one of the plurality of apertures and a second end stud welded to the underlying tubular to hold the first strake section and the second strake section to the tubular.

12. The VIV suppression system of claim 11 wherein the base member of the first strake section and the base member of the second strake section are dimensioned to encircle less than 30 percent of a circumference of the tubular.

13. The VIV suppression system of claim 11 wherein the plurality of apertures are positioned along a side of the helical fin.

14. The VIV suppression system of claim 11 wherein each of the plurality of apertures further comprise a bushing positioned therein.

15. The VIV suppression system of claim 11 wherein the connecting member comprises an extension member extending from an end of the first strake section or the second strake section and a bracket mounted to the underlying tubular, wherein the extension member is attached to the bracket to hold the first strake section or the second strake section to the underlying tubular.

16. The VIV suppression system of claim 11 wherein the first strake section and the second strake section are connected to one another at their ends and a gap is formed between the first strake section and the second strake section.

17. The VIV suppression system of claim 11 wherein the first strake section and the second strake section are circumferentially arranged around the underlying tubular and are at least 120 degrees circumferentially apart.

18. A vortex-induced vibration (VIV) suppression apparatus comprising:

a base member having an interior surface dimensioned to at least partly encircle a tubular member, wherein the base member comprises a length, and the length covers less than 90 degrees of the tubular member when the base member is positioned on the tubular member;

a fin protruding outward from an exterior surface of the base member;

at least one aperture formed through the base member, from the interior surface to the exterior surface; and an intermediate member positioned between the base member and the tubular member, wherein the intermediate member comprises a cross beam coupled to a plurality of cross braces, and the cross braces are coupled to the interior surface of the base member and dimensioned to couple to an exterior surface of the tubular member.

19. A vortex-induced vibration (VIV) suppression apparatus comprising:

a base member having an interior surface dimensioned to encircle less than 30 percent of a circumference of a tubular member;

a fin protruding outward from an exterior surface of the base member, and the fin comprises a height that is at least 3 percent of an outside diameter of the tubular member; and at least one aperture formed through the base member, from the interior surface to the exterior surface; and a connecting member mounted to an underlying tubular and dimensioned to directly connect the base member to the underlying tubular, and wherein the connecting member comprises a bolt having a first end dimensioned to be inserted through the at least one aperture and a second end stud welded to the underlying tubular.

20. A vortex-induced vibration (VIV) suppression apparatus comprising:

a base member having an interior surface dimensioned to at least partly encircle a tubular member;

a fin protruding outward from an exterior surface of the base member;

at least one aperture formed through the base member, from the interior surface to the exterior surface; and an intermediate member positioned between the base member and the tubular member, wherein the intermediate member comprises a cross beam coupled to a plurality of cross braces, and the cross braces are coupled to the interior surface of the base member and dimensioned to couple to an exterior surface of the tubular member.

* * * * *